Figure 1:
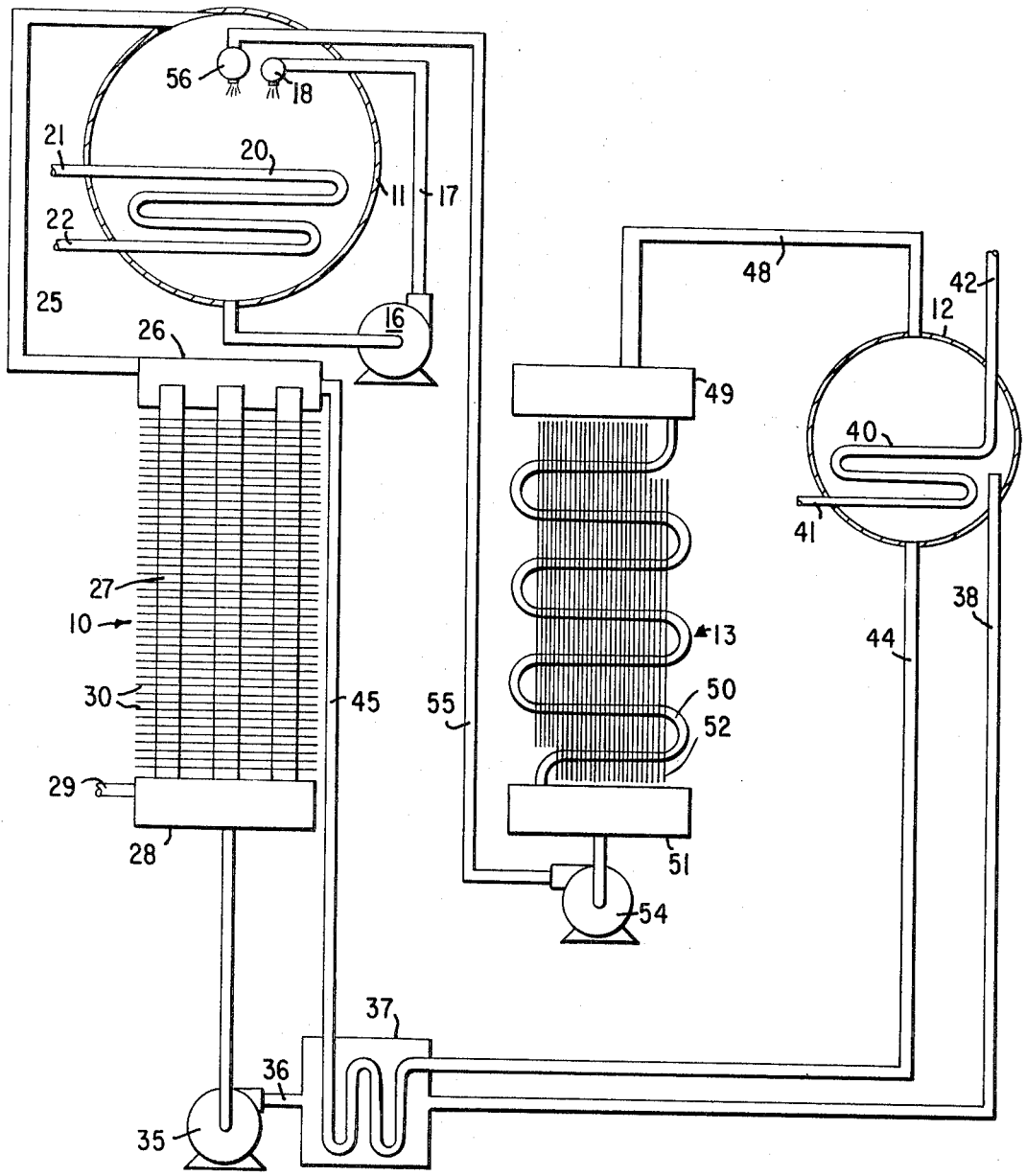

INVENTOR.
WENDELL J. BIERMANN.

INVENTOR.
WENDELL J. BIERMANN.
BY Frank N. Decker Jr.
ATTORNEY.

United States Patent Office 3,316,728
Patented May 2, 1967

3,316,728
ABSORPTION REFRIGERATION SYSTEMS
Wendell J. Biermann, 45 Foxcraft Drive,
Fayetteville, N.Y. 13066
Filed Dec. 23, 1965, Ser. No. 515,928
15 Claims. (Cl. 62—112)

This invention relates to absorption refrigeration and more particularly to an absorption refrigeration system having an improved absorbent solution.

In the past, large size absorption refrigeration machines have generally employed an aqueous solution of lithium bromide as an absorbent and water as a refrigerant. Experience has dictated that among the known absorbents, lithium bromide has been a highly satisfactory absorbent salt because of its vapor pressure-temperature characteristics, its low toxicity, and its high affinity for water vapor.

The use of a lithium bromide solution as an absorbent, however, has imposed a number of significant limitations on the design of absorption refrigeration equipment. In particular, the crystallization characteristics of lithium bromide solution at low temperatures and the fact that it is more difficult to control corrosion in the machine at very high temperatures have tended to limit the practical operating temperatures at which the absorption machine generator may operate. Consequently, the use of high temperature heating media and the development of staged absorption machines have been inhibited by the lithium bromide absorbent characteristics.

In addition, the vapor pressure-temperature characteristics of lithium bromide absorbent solutions are such as to render it only marginally satisfactory for use with known air-cooled absorption refrigeration machines because satisfactorily low vapor pressures cannot be achieved at the relatively high absorber temperatures which must be utilized in air-cooled machines.

It is therefore a principal object of this invention to provide an absorption refrigeration machine having an improved absorbent solution.

In accordance with this invention, there is provided an absorption refrigeration machine having an absorbent solution which comprises a mixture of certain relatively highly dissociated lithium salts with certain relatively soluble lithium salts of oxy-acids. It has been discovered that use of certain of such mixtures results in an unexpectedly lower vapor pressure than that which can be obtained with solutions of either constituent salt alone. The reason for this phenomenon may not be entirely understood; however, it appears that the total concentration of lithium ions in solution can be increased by the mixture of a relatively highly soluble salt with one which is relatively poorly dissociated.

For example, it has been discovered that when lithium bromide or lithium chloride is mixed in a solution with other lithium compounds such as lithium chlorate, lithium nitrate, and lithium nitrite, the resulting solution unexpectedly has a lower vapor pressure than can be obtained with either compound alone. In particular, it has been discovered that absorbent solutions saturated at similar temperatures containing significant quantities of lithium chlorate in combination with either lithium bromide or lithium chloride unexpectedly produce markedly lower vapor pressures than similarly saturated solutions of any of the compounds by themselves.

The absorbent solutions in accordance with this invention produce unexpectedly low vapor pressures which make them adaptable to use in air-cooled or staged absorption refrigeration machines. Likewise, a preferred absorbent solution containing lithium bromide and lithium chlorate unexpectedly has characteristically low corrosion rates of mild steel surfaces at high temperatures and permits the use of generator temperatures which are not presently feasible and makes feasible the use of high temperature, plural stage absorption machines. Furthermore, absorbents in accordance with this invention have an exceedingly and unexpectedly high affinity and capacity for absorption of water vapor so that the solution quantity flow and heat rejection required in the refrigeration system is minimized, thereby reducing the cost of the system, and have desirably high solidification temperatures.

Figure 2:
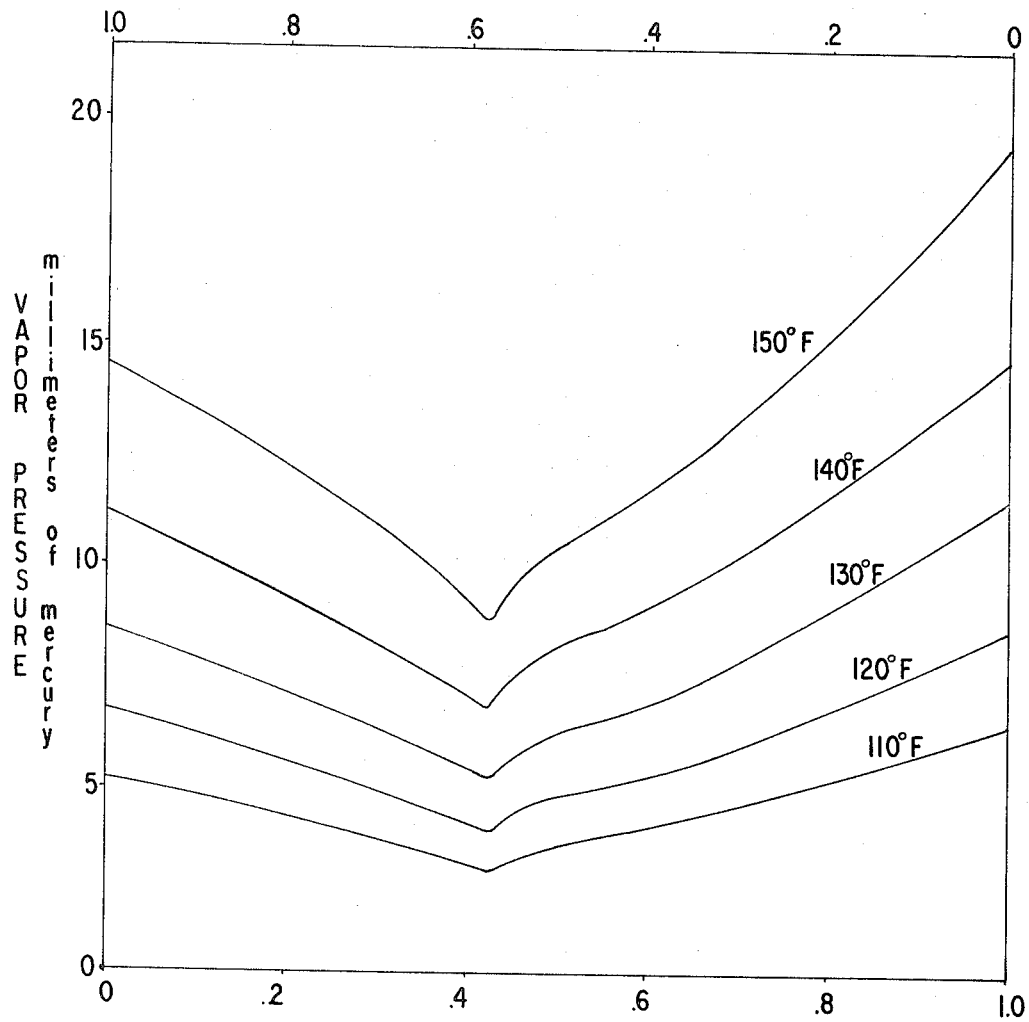

The above and other objects of this invention will become more readily apparent with reference to the following specification and attached drawings wherein:

FIGURE 1 is a schematic diagram of an air-cooled absorption refrigeration machine of a type to which this invention may be applied; and FIGURE 2 is a graph depicting experimentally derived vapor pressure-temperature characteristics of an absorbent solution in accordance with this invention.

Referring to FIGURE 1, there is schematically illustrated a flow diagram for an air-cooled absorption refrigeration machine. The absorption refrigeration machine comprises an absorber 10, a refrigerant evaporator 11, a generator 12, and a refrigerant condenser 13 which are connected to provide refrigeration.

A pump 16 withdraws liquid refrigerant from the bottom of evaporator 11 and passes it through line 17 and a spray header 18 over an evaporator heat exchanger 20. Water to be chilled is passed through line 21 into heat exchanger 20 where it gives up its heat to evaporate refrigerant and is thereby cooled. The cooled water is passed through leaving chilled water line 22 to a desired location for cooling a desired region.

The vapor formed by evaporating refrigerant in evaporator 11 is passed through vapor line 25 into upper header 26 of absorber 10. Absorber 10 comprises a plurality of heat exchange tubes 27 which extend between, and open into, upper header 26 and a lower header 28. Strong absorbent solution is passed into upper header 26 from which it passes downwardly into lower header 28 along the inner walls of heat exchange tubes 27. Simultaneously refrigerant vapor passes from upper header 26 downwardly through heat exchange tubes 27, where it is absorbed into the strong absorbent solution flowing down the heat exchange tubes. The absorbent solution, which is weak in absorbing power due to absorption of refrigerant vapor, is collected in the bottom of lower header 28. A purge line 29 is provided to remove relatively noncondensible gases from the machine. Heat exchange tubes 27 are provided with a plurality of fins 30. Suitable means such as a fan (not shown) may be provided for passing air in heat exchange relation with fins 30 and heat exchange tubes 27 for cooling the absorbent solution to promote effective absorption of the refrigerant vapor in the heat exchange tubes.

As used herein, the term "strong solution" is used to designate an absorbent solution which is strong in absorbing power and the term "weak solution" is used to designate an absorbent solution which is weak in absorbing power due to the absorption of refrigerant vapor.

The weak absorbent solution is passed from the bottom of lower header 28 by pump 35 through weak solution line 36 and through one side of a heat exchanger 37. The weak solution passes from heat exchanger 37 through weak solution line 38 into generator 12. Generator 12 is provided with a heat exchanger 40 for passing a heating medium in heat exchange relation with weak solution therein. A heating medium, such as steam, may be passed through line 41 into heat exchanger 40 and the heating medium may be exhausted from heat exchanger 40 through line 42. Generator 12 may alternatively be of the "direct-fired type" wherein the heating medium in heat exchanger 40 is hot flue gas from a suitable gas burner. Heating of the weak solution in generator 12 drives off refrigerant vapor and concentrates the weak solution, thereby forming strong solution.

The strong solution passes from generator 12, through strong solution line 44, and through a second passage in heat exchanger 37. The strong solution passing through heat exchanger 37 is in heat exchange relation with the weak solution passing therethrough, thereby preheating the weak solution prior to its discharge into the generator and precooling the strong solution prior to its discharge through line 45 into upper header 26 of absorber 10.

The refrigerant vapor which is formed in generator 12 passes through vapor line 48 into upper header 49 of condenser 13. Condenser 13 comprises a heat exchange coil 50 connecting upper header 49 and a lower header 51. A plurality of fins 52 are provided on the exterior surface of heat exchange coil 50 to provide extended heat transfer surface. A suitable means, such as a fan (not shown), may be employed to pass air over the exterior surfaces of heat exchange coil 50 to cool and condense refrigerant vapor therein. The condensed refrigerant vapor is collected in the bottom of lower header 51 and passed by refrigerant pump 54 through a refrigerant line 55 and a spray header 56 over heat exchanger 20 in refrigerant evaporator 11.

It will be appreciated that the system illustrated in the drawing is merely illustrative of a schematic embodiment of one type of air-cooled absorption refrigeration machine and that various other types of machines, which may be either air or water-cooled, may be employed without departing from the scope of this invention.

For the purposes of this invention, water is a highly satisfactory refrigerant because it is readily available, inexpensive, nontoxic, and has a relatively high dipole moment which facilitates its entering into a chemical combination with a variety of absorbents. The use of water as a refrigerant establishes the pressure at which the absorber section of the refrigeration machine must work in order to provide a given refrigerant temperature. For example, a typical air conditioning evaporator design temperature is approximately 44° F. which corresponds to an absorber pressure of 7.4 millimeters of mercury. Consequently, the absorbent solution employed in the absorber should have an effective vapor pressure no higher than about 7.4 millimeters of mercury at the temperature to which it is feasible to cool the absorbent solution.

In practice, it is usually assumed that a cooling tower water-cooled refrigeration machine can operate at a minimum aborber temperature of about 100° F. and that an air-rooled absorption refrigeration machine can operate at a minimum absorber temperature no lower than about 130° F. at an outdoor temperature of 95° F. It is desirable to provide an absorbent solution for water vapor which has a vapor pressure sufficiently below that of the commonly used lithium bromide absorbent solution so that the absorption refrigeration machine may be air-cooled. Likewise, an absorbent solution having a relatively low vapor pressure is desirable for use with a multi-stage absorption refrigeration machine.

It has been discovered, in accordance with this invention, that combinations of certain salts exhibit very large deviations from Raoult's law and actually produce unexpectedly low vapor pressure when employed in combination with each other. While the reason for this phenomenon is not completely understood, it appears possible that the degree of dissociation of the salt in solution is a material factor in determining the resultant vapor pressure. Since, however, highly dissociated lithium salts are characteristically less soluble than the less highly dissociated lithium salts, due to the energy required to effect dissociation, such salts do not normally make good absorbents. It has, however, been found that by mixing significant quantities of reasonably soluble, highly dissociated lithium salts, such as lithium bromide or lithium chloride, with certain moderately or highly soluble lithium salts of oxy-acids, the resulting vapor pressure of a saturated solution of the mixed salts is actually lower than that which can be obtained from a saturated solution of either of the constituent salts alone.

FIGURE 2 shows a graph of the approximate vapor pressure-temperature characteristics of an aqueous solution containing a combination of lithium bromide and lithium chlorate for various mole fractions of the constituent salts in the solution. It will be seen from the graph that a solution of lithium bromide alone which is saturated at 77° F. exhibits a vapor pressure of about 5.5 millimeters of mercury at 110° F. and that a solution of lithium chlorate which is saturated at 77° F. exhibits a vapor pressure at 110° F. of about 4.0 millimeters of mercury. However, if these two salts are mixed in a solution saturated at 77° F. in the ratio of about .57 mole fraction of lithium chlorate and .43 mole fraction of lithium bromide, the vapor pressure of the solution is about 2.2 millimeters of mercury at about 110° F. which is substantially lower than that obtainable by using a solution of either constituent salt alone.

The data illustrated in FIGURE 2 was obtained by making dew point measurements on solutions of various concentrations at different temperatures by the following technique. A closed steel vessel of approximately 8 x 18 inches was filled to a level of about 6 inches with a solution of lithium chlorate and lithium bromide, the concentration and composition of which were verified by standard analytical techniques. The steel vessel was provided with a recirculation loop and a pump which withdrew solution from the bottom of the vessel and sprayed it from a spray nozzle at the top of the vessel. The vessel included a wet wick thermometer which was continually wetted by a relatively small quantity of water, the evaporation of which had a negligible effect on the concentration of the much larger volume of solution in the vessel. The recirculated solution was heated with a steam jacket placed around the recirculation line and the temperature of the solution sprayed in the vessel was measured with a thermometer disposed in the recirculation line. The vessel was purged of air and other relatively noncondensible gases.

The continuously recirculated solution was heated to a desired temperature by passing steam through the steam jacket and readings of the solution temperature and the wet wick thermometer temperature were taken when the vapor pressure and temperatures had reached equilibrium. The wet wick temperature was then converted, by using a standard steam table, to solution vapor pressure. The accuracy of this technique was estimated to be about plus or minus .1 millimeter of mercury. The results of applying this technique for various concentrations and temperatures and various runs were then combined and plotted to provide the data shown in FIGURE 2.

A second technique was employed to determine whether significant deviations from Raoult's law could be observed for various other combinations of lithium halides and lithium salts of oxy-acids. This data was obtained by preparing saturated solutions of the constituent salts and of mixtures thereof by placing an excess quantity of the salts and a quantity of water in a glass flask. The flask was then immersed in a water bath whose temperature was held at exactly 77° F. for a period of at least 24 hours and until the aqueous solution in the flask was saturated, as determined by the measured solution composition remaining constant as determined by chemical analysis. The resulting saturated solution was then placed in a glass flask which was connected to a mercury-filled U-tube manometer. The solution was degassed and the flask and manometer were evacuated with a vacuum pump. The evacuated flask containing the sample solution was placed in a stirred water bath.

The water bath temperature was then adjusted to the temperature at which it was desired to obtain the vapor pressure of the solution, and after the solution in the flask and the water bath had reached equilibrium, pressure readings were taken at intervals of 10° starting at 110° F. The composition of the solution was analyzed by standard chemical analytic procedures to determine the mole fraction of each of the constituents present in order to provide data on the concentration of the solution. The data for various mole ratios at 110° F. was found to be representative of data at other temperatures for purposes of comparison. This test procedure was estimated to have accuracy of about plus or minus .5 millimeter of mercury and was valid to obtain comparative data.

It was discovered that relatively soluble lithium salts of oxy-acids which had a solubility in excess of 15 molal (gram formula weights of solute per kilogram of solute) exhibited the behavior described when mixed in significant quantities with the group of lithium halides consisting of lithium bromide and lithium chloride.

The table below lists the approximate optimum mole ratios of salts for various examples of absorbent solutions discovered to have unexpectedly low vapor pressures by mixing a combination of salts. In each example, the solutions were saturated at 77° F., the vapor pressure data was taken at 110° F., and the pressures are in millimeters of mercury.

| Lithium Salt A | | Lithium Salt B | | Mole Fraction | | Approx. Vapor Pressure Solution at 110° F., mm. |
|---|---|---|---|---|---|---|
| Lithium Halide | Vapor Pressure Solution at 110° F., mm. | Li Salt of Oxy-Acid | Vapor Pressure Solution at 110° F., mm. | Salt A | Salt B | |
| LiBr | 5.5 | LiClO$_3$ | 4.0 | 0.43 | 0.57 | 2.2 |
| LiBr | 5.5 | LiNO$_2$ | 20.7 | 0.80 | 0.20 | 4.0 |
| LiBr | 5.5 | LiNO$_3$ | 30.0 | 0.70 | 0.30 | 4.4 |
| LiCl | 8.5 | LiClO$_3$ | 4.0 | 0.25 | 0.75 | 2.5 |
| LiCl | 8.5 | LiNO$_2$ | 20.7 | 0.75 | 0.25 | 4.7 |
| LiCl | 8.5 | LiNO$_3$ | 30.0 | 0.90 | 0.10 | 7.0 |

It will be seen from the table that when either lithium chlorate, lithium nitrate or lithium nitrite is mixed in the listed concentration with either lithium bromide or lithium chloride, the resulting saturated solution exhibits a lower vapor pressure at 110° F. than the vapor pressure obtainable from a saturated solution of either salt alone at the same temperature.

The mole ratio listed in the table is the approximate ratio of salts which was found to produce the lowest vapor pressure at 110° F. and is not intended to specify a necessary ratio of the salts involved for operation of an absorption refrigeration machine. It will be appreciated that considerations such as corrosion, viscosity, heat transfer, cost and desired operating temperatures may dictate the desirability of using a mole ratio of the salts different from that listed in the table.

It is necessary that more than small or trace amounts of each of the constituent salts be present in the solution to provide the vapor pressure lowering effect described. It has been found that at least one mole percent of each of the constituents must be present for a measurably significant lowering of vapor pressure to take place. However, for a practical absorption refrigeration application of this invention, it is desirable that at least about five mole percent and not greater than about 95 mole percent of each of the constituent salts be present in the absorbent solution in order to provide a usable and commercially practical advantage over single salt solutions.

An absorption refrigeration system employing an absorbent solution in accordance with this invention may be of either the liquid or the air-cooled type and may employ either a single stage, double stage, or double effect absorption refrigeration machine. In addition, various corrosion inhibitors such as lithium hydroxide or heat transfer enhancing additives may be employed in the absorbent solution in addition to the absorbent salts listed. The effect of such materials on vapor pressure of the absorbent solution is fairly negligible, and therefore, their presence may be disregarded in considering the salts present in the solution. The desirably low vapor pressure of the multiple salt systems named permits an absorber to be operated at a higher capacity for a given set of absorber temperature conditions or permits the absorber to be cooled by air instead of water in contrast to the use of one of the salts alone. Also, the salts named have much higher crystallization temperatures than lithium bromide, for example, which enables different ranges of concentrations to be used without encountering undesirable crystallization of absorbent solution. Since the affinity and capacity of the multiple salt absorbent solutions for water vapor are higher than that of solutions of one of the salts alone, it will be apparent that more refrigerant can be absorbed by the absorbent solution and thus less liquid need be pumped through the system with a corresponding improvement in initial cost as well as operating cost due to an improved coefficient of performance.

While preferred embodiments of this invention have been described for purposes of illustration, it will be appreciated that the invention will otherwise be embodied within the scope of the following claims.

I claim:

1. An absorption refrigeration system comprising an evaporator, an absorber, a generator, and a condenser connected to provide refrigeration; said system including a refrigerant, and an absorbent solution for absorbing said refrigerant; wherein the improvement comprises: said absorbent solution comprising an aqueous solution including a first material comprising a lithium salt of an oxy-acid selected from the group consisting of lithium chlorate, lithium nitrate, and lithium nitrite, dissolved in said solution in an amount in excess of one mole percent; and a second material comprising a lithium halide compound selected from the group consisting of lithium bromide and lithium chloride, dissolved in said solution an amount in excess of one mole percent.

2. An absorption refrigeration system as defined in claim 1 wherein said absorbent solution comprises lithium chlorate and lithium bromide.

3. An absorption refrigeration system as defined in claim 1 wherein said absorbent solution comprises lithium chlorate and lithium chloride.

4. An absorption refrigeration system as defined in claim 1 wherein said absorbent solution comprises lithium nitrite and lithium bromide.

5. An absorption refrigeration system as defined in claim 1 wherein said absorbent solution comprises lithium nitrite and lithium chloride.

6. An absorption refrigeration system as defined in claim 1 wherein said absorbent solution comprises lithium nitrate and lithium bromide.

7. An absorption refrigeration system as defined in claim 1 wherein said absorbent solution comprises lithium nitrate and lithium chloride.

8. An absorption refrigeration system as defined in claim 1 wherein said absorbent solution includes water, and wherein said refrigerant also comprises water.

9. A hygroscopic aqueous salt solution for absorption of water vapor comprising water; a member selected from the group consisting of lithium chlorate, lithium nitrate, and lithium nitrite, dissolved in said solution in an amount in excess of one mole percent; and a member selected from the group consisting of lithium bromide and lithium chloride, dissolved in said solution in an amount in excess of one mole percent.

10. A hygroscopic salt solution as defined in claim 9 wherein said solution comprises lithium chlorate and lithium bromide.

11. A hygroscopic salt solution as defined in claim 9 wherein said solution comprises lithium chlorate and lithium chloride.

12. A hygroscopic salt solution as defined in claim 9 wherein said solution comprises lithium nitrite and lithium bromide.

13. A hygroscopic salt solution as defined in claim 9 wherein said solution comprises lithium nitrite and lithium chloride.

14. A hygroscopic salt solution as defined in claim 9 wherein said solution comprises lithium nitrate and lithium bromide.

15. A hygroscopic salt solution as defined in claim 9 wherein said solution comprises lithium nitrate and lithium chloride.

References Cited by the Examiner

UNITED STATES PATENTS

| 1,961,890 | 6/1934 | Miller et al. | 252—69 |
| 3,004,919 | 10/1961 | Rush et al. | 252—67 |
| 3,158,008 | 11/1964 | Aronson | 62—476 |

LLOYD L. KING, *Primary Examiner.*